(12) United States Patent
Sekino et al.

(10) Patent No.: US 6,459,437 B1
(45) Date of Patent: Oct. 1, 2002

(54) COLOR CONVERTING DEVICE

(75) Inventors: Masanori Sekino; Yutaka Koshi; Fujio Ihara; Shunichi Kimura; Taro Yokose; Koh Kamizawa, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/453,716

(22) Filed: Dec. 3, 1999

(30) Foreign Application Priority Data

Jan. 7, 1999 (JP) .......................................... 11-002331

(51) Int. Cl.[7] ............................................... G06T 11/40
(52) U.S. Cl. ....................................... 345/604; 345/606
(58) Field of Search ................................ 345/589, 591, 345/600, 603, 604, 606, 607

(56) References Cited

U.S. PATENT DOCUMENTS 6,137,494 A * 10/2000 Nin ............................ 345/606

FOREIGN PATENT DOCUMENTS

| JP | 58-16180 | 3/1983 |
| JP | 5-46750 | 2/1993 |
| JP | 8-116456 | 5/1996 |

* cited by examiner

Primary Examiner—Matthew Luu
(74) Attorney, Agent, or Firm—Morgan, Lewis & Bockius LLP

(57) ABSTRACT

An index signal and a delta signal are generated from an input pixel value, and then, inputted to an input buffer by every predetermined pixel to be processed. A controlling unit compares the index signal in the input buffer with a tag (index signal) in a coefficient cache. When they coinside with each other, the controlling unit reads out the corresponding coefficient from the coefficient cache and supplies the same to an interpolating unit. The interpolating unit simultaneously receives the delta signal and supplies the keeping color data to an output buffer. Thereafter, the interpolating unit accesses to the coefficient storing memory by using an index signal that does not coinside with either one of cache-tag (index signal) to obtain a coefficient, and similarly, interpolatively generates color data. Data of converted color is outputted from the output buffer in the order of inputting the pixel. A color converting device of the present invention can perform a color conversion with high precision without increasing a reading-out band of a coefficient table for a color conversion.

6 Claims, 15 Drawing Sheets

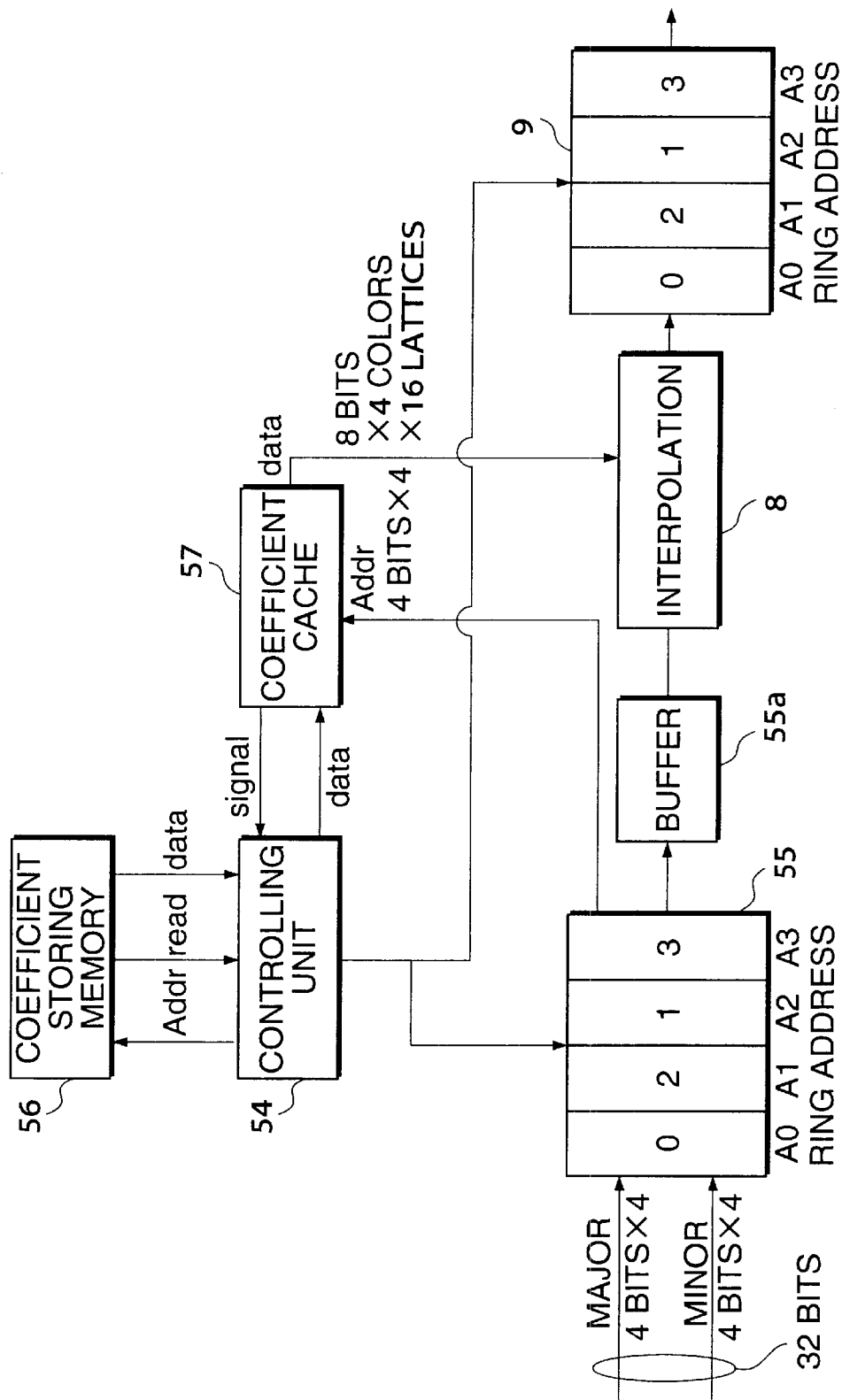

COLOR CONVERTING DEVICE

BACKGROUND OF THE INVENTION

1. Field of the Invention

The present invention relates to a color converting device that converts a pixel value represented in a predetermined color space into a pixel value represented in a different color space and outputs the converted pixel value.

2. Description of the Related Arts

There is a device that converts an input pixel value represented in a predetermined color space into a pixel value represented in a different color space and outputs the converted pixel value as an output pixel value. The color space in which the input pixel value is represented is referred to as an input color space and the color space in which the output pixel value is represented is referred to as an output color space hereinbelow. There have been various devices adopting various methods for converting a pixel value.

For example, there is a device that an input color space represented by RGB is converted into an output color space represented by YCbCr, as is well known as a television set. The color space processing from RGB into YCbCr can be represented by a simple conversion equation of $Y=0.6G+0.3R+0.1B$, $Cb=Y-B$, $Cr=Y-R$. Accordingly, a color converting device from RGB into YCbCr can be realized by an arithmetical device that processes the conversion equation.

However, there is a case where a complicate conversion process from the input color space into the output color space cannot be represented by a simple conversion equation. Example of such a case is the one for converting RGB inputted by a scanner into YMC of a printing device. The RGB is a color space according to spectrum characteristics of an optical sensor of the scanner, while the YMC is a color space according to spectrum characteristics of ink of the printing device or tone characteristics of a mesh point, so that the relationship between RGB and YMC frequently becomes a nonlinear to afford a complicate conversion equation. Therefore, a realization of a converting device by using an arithmetical device executing the conversion equation entails a problem of large-sized device or long processing period.

In order to deal with the case where the conversion from the input color space into the output color space is complicate, there has been proposed a device that stores an output pixel value corresponding to an input pixel value in a conversion table in advance and performs a processing for simply referring the Conversion table to thereby realize a color conversion.

However, such a device has a problem that a capacity of the conversion table rapidly increases as the kind of the input pixel value, i.e., the tone number increases. For example, the capacity of the conversion table is $n^3$ in case where the input color space is represented by n tone of each RGB.

In order to deal with the case of plenty of tone numbers of the input pixel value, there has been proposed a device in which a conversion table is divided into plural portions for storing an output pixel value only at a position of a lattice point of a subspace. If there is no lattice point corresponding to the input pixel value, a value of a lattice point in the vicinity thereof is interpolated to be used. Specifically, such a converting device comprises, as shown in FIG. 13, a pixel value inputting part 101, index converting part 102, delta converting part 103, coefficient storing part 106 and interpolating part 108. With respect to the lattice point positioned at the boundary of a subspace of an input color space, a corresponding output pixel value (referred to as interpolation coefficient hereinbelow) is stored in advance in the coefficient storing part 106. Further, this device converts the input pixel value 110 into a position (index) 111 of a subspace and a position (delta signal) 112 in the subspace. An interpolation coefficient 120 corresponding to the lattice point that composes the subspace is taken out from the conversion table based upon the index, whereupon the interpolating part 108 performs an interpolation by using the interpolation coefficient 120 and the position (delta signal) 112 in the subspace for obtaining an output pixel value 123. Such a construction can reduce the capacity of the conversion table. This type of color converting device is disclosed, for example, in Japanese Published Examined Patent Application No. Sho 58-16180.

However, the problem of increasing the number of referring times of the conversion table still exists depending upon the interpolating method. When the number of the referring lattice point is designated by G, the number of referring times to the conversion table is proportional to G. In the case of input color space of three colors such as RGB, for example, a considered case is the one in which the input color space is divided into a plurality of rectangular solids and a linear interpolation is performed by using eight lattice points composing the rectangular solids. At this time, the conversion table has to be referred to eight times for processing one input pixel value.

There has been proposed a device in which an idea is put to take out the lattice point in order to decrease the number of the referring times to the conversion table. A color converting device disclosed in Japanese Published Unexamined Patent Application No.

Hei 5-46750, for example, adopts an input color space of three colors and uses a vertex of a triangular prism to which the input pixel value belongs as a lattice point. By using six vertexes of the triangular prism that is decreased in number compared with eight vertexes of the rectangular solid, the number of referring times to the conversion table per one input pixel decreases from eight times to six times.

However, there occurs a problem of increasing an interpolation error when the referring lattice point is decreased in the interpolating processing. As the interpolation error increases, the color conversion error increases, to deteriorate a performance as a color converting device.

Further, the color converting device using the conversion table has a problem of increasing the number of referring times to the conversion table when the number of colors of the input color space increases. When the number of the input color space is designated by D, the number of the referring times to the Conversion table becomes $_2D$. Assuming that the vertex f D-dimensional rectangular solid is used as a lattice point, eighth reference per one pixel is required in the input color space of three colors of YMC, while sixteenth reference is required per one pixel in the input color space of four colors of YMCK.

In order to deal with the input color space of four colors, there has been proposed, for example, a device in which the input color space is limited to YMCK so that a conversion table of three colors of YMC is used and a conversion of K alone is performed like a color converting device disclosed in Japanese Published Unexamined Patent Application No. Hei 8-116456. This device can realize a color conversion with relatively high precision with less scale of the device under a condition that the generating method of K is not greatly changed between the input color space and the output color space. However, this device does not have a function of greatly changing the generating method of K in the output color space.

The conventional color converting device simplifies its converting method in order to realize a complicated conversion from the input color space into the output color space with less scale of the device. As a result, the precision of the color conversion is somewhat deteriorated, but the effect of reducing the scale of the device takes first priority.

However, high image quality is advanced with respect to an image output device such as a printing device or printer. There is a possibility that the conventional conversion precision cannot deal with these image output devices having high image quality. Therefore, it is important to avoid a technique that can be a factor to deteriorate the conversion precision. The following two points are specifically considered.

(1) To avoid a reduction in interpolation precision due to a simplification of the interpolating method such as a triangular prism interpolation.

(2) To color-convert the input pixel represented by four colors such as YMCK with high precision.

In order to attain the subjects, the interpolation may be made by referring to a sufficient number of lattice points in the input color space of four colors. However, as the number of input color and lattice point increases, the number of referring times to the conversion table increases, which becomes a problem. In case where a vertex of four-dimensional hypercube is referred to as a lattice point in the input color space comprising YMCK, for example, the conversion table has to be referred to sixteenth time in order to color-convert one input pixel. It is assumed here that image data of A4 size in JIS that is sampled with a resolution of 24(dots/mm) and quantized with a tone precision of 8 (bit/pixel) of each YMCK color is converted into an output color space of YMCK for one second. The image data is 35(Mpixel) in total, so that the input pixel value is inputted to the color converting device with a speed of 35(Mpixel/sec). At this time, the reading-out band of the conversion table reaches 35(Mpixel/sec)*16*4(Byte)=2.24(Gbyte/sec). Further, the capacity of the conversion table is $32^4$*4(Byte)= 4(Mbyte) if the dividing number of the input color space is $2^5$=32 divisions per each color. Moreover, the order of access to the conversion table is determined depending upon the input pixel value, so that it cannot always be a continuous address, with the result that a high-speed reading-out method such as a burst access cannot be adopted. It is difficult to realize such high-speed memory part with large capacity having no regulation in the access pattern. If realized, there is a problem of large-scale device. FIG. 14 shows a processing speed per one page and a required reading-out band of the conversion table. As shown in the figure, a memory device having a reading-out band of giga-byte class and capable of doing a random access is required when the page exceeds 60 pages per minute. This is difficult to realize as it is.

SUMMARY OF THE INVENTION

In a color converting device interpolating by referring to a sufficient number of lattice points in an input color space of four colors, the present invention decreases the number of referring times to a conversion table without deteriorating a conversion precision to thereby prevent a scale of the device from becoming large.

The conversion table can be realized by a general memory device. The memory device that a high-speed access is possible is tend to have a small memory capacity, while the memory device with a large memory capacity is tend to have a slow access speed. A general-purpose computer includes a memory hierarchically composed in order to attain both high-speed access and large capacity memory. For example, a high-speed memory with small capacity, i.e., a cache memory is disposed in the vicinity of an arithmetical device, and a low-speed memory with large capacity, i.e., main memory is disposed at the position remote from the former memory. The original data is stored in the main memory. The data once read from the main memory by the arithmetical device is cached in the cache memory. When the same data is read by the arithmetical device, the data is read from the cache memory instead of the main memory. By this, a high-speed reading-out can be executed in case where the data once read by the arithmetical device from the main memory is repeatedly read out.

A coefficient cache memory is provided between the conversion table and the interpolating part of the color converting device for storing therein the interpolation coefficient that are once read from the conversion table by the interpolating part like the same view of the hierarchical memory of the general-purpose computer. In case where the same interpolation coefficient is read out, it is read out from the coefficient cache memory instead of the conversion table. By this, the number of the effective access times of the conversion table can be decreased, whereby the conversion table can be constructed with a lower-speed memory without decreasing the color conversion speed.

Although the concept is similar to the hierarchical memory of the general-purpose calculator, the following differences exist.

(1) Only the read-out data may be cached. A complicate operation for maintaining a consistency of data between the cache and main memory due to the writing is not required like the general-purpose calculator.

(2) A hit ratio of the cache is not enhanced by depending upon the characteristics of the inputted image data only by providing the coefficient cache memory. Conversely, the hit ratio can be enhanced by utilizing the characteristics of the inputted image data.

Therefore, the color converting device has a memory construction special for the color converting device as described later. Firstly, an outline of each method will be explained.

An out-of-order method performs a color conversion first from the input pixel value that can be interpolated by using the coefficient already cached in order to improve the hit ratio of the coefficient cache. The color conversion of the input pixel value is an independent processing depending only upon its pixel, so that the processing order of the input pixel data may be arbitrary. This method is the one in which the order of the color conversion is positively changed for improving the hit ratio.

A bit mixing method is the one in which, when the conversion table is constructed by a memory, an interpolation coefficient of the close lattice point in the input color space is also positioned at the close address in the memory-address space, to thereby improve the hit ratio of the cache. As general characteristics of image data, it is expected that, when one pixel value exists, a pixel value similar to the one pixel value exists in its vicinity. Specifically, in case where there is an input pixel value belonging to some subspace, a pixel value belonging to the subspace in its vicinity is easy to be inputted in the near future. Therefore, in the case of caching the interpolation coefficient, it is effective to cache the surrounding interpolation coefficient with the interpolation coefficient that generates a miss-hit. Generally, all data for a line size is cached with respect to the sequential addresses of the memory. Therefore, it is possible to cache the surrounding interpolation coefficient with the interpolation coefficient that generates a miss-hit by arranging the interpolation coefficient of the close lattice point in the input color space at the close address in the memory-address space.

A scan order changing method changes the order of the conversion processing of the input pixel value to the order in which the correlation between the pixels increases, to thereby improve the hit ratio of the coefficient cache. As general characteristics of image data, it is expected that, when one pixel value exists, a pixel value similar to the one pixel value exists in its vicinity as described above. Specifically, the correlation of the pixel value between the adjacent pixels is high. As for the inputting order of the input pixel value, a raster scanning order is frequently used in which a scanning is performed from right to left, and from top to bottom of the image. However, the raster scanning order only utilizes the correlation between pixels in an one-dimensional direction of an image. Therefore, a two-dimensional scanning order is established, to thereby utilize the correlation between pixels in the two-dimensional direction of the image, whereby the hit ratio is more improved.

A pre-reading method pre-reads the input pixel value for reading in advance the interpolation coefficient that is required in the future in order to improve the hit ratio of the coefficient cache. In the cache of the general-purpose computer, an instruction or data that is required in the future is confirmed only as a result of executing the instruction, whether it is an instruction cache or data cache. However, the interpolation coefficient is determined depending only upon the input pixel value. Therefore, the interpolation coefficient that is required in the future is confirmed if the inputting order of the input pixel value is determined. In case where the data not temporarily memorized in the general cache is read out, the data is read from the main memory having a low reading-out speed in general cache. Therefore, all processing is held during this period. It is expected that a similar pixel value is continuous as general characteristics of the image data. However, whether the cache is hit or not is fluctuated depending upon the input image as a matter of course. For example, it may occur that the several pixels are continuously hit to the cache, but then, several pixels are continuously miss-hit to the cache. The pre-reading method buffs such fluctuation to thereby enhance the reading-out speed of the average interpolation coefficient.

According to an aspect of the present invention, the color converting device has a pixel value inputting part that inputs an input pixel value to a main body of the color converting device, an index converting part that outputs from the input pixel value an index signal showing a subspace to which the input pixel value belongs, a delta converting part that outputs from the input pixel value a delta signal showing a position of the input pixel value in the subspace, a coefficient storing part that outputs from the index signal an interpolation coefficient of a lattice point positioned at a top of the corresponding subspace, and an interpolating part that obtains an output pixel value by an interpolating processing from the interpolation coefficient and the delta signal and outputs the output pixel value. The device also has a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given.

By this construction, the color conversion can be performed by providing the cache without increasing the reading-out band of the conversion table.

According to another aspect of the present invention, the color converting device has a pixel value inputting part that inputs an input pixel value to a main body of the color converting device, an index converting part that outputs from the input pixel value an index signal showing a subspace to which the input pixel value belongs, a delta converting part that outputs from the input pixel value a delta signal showing a position of the input pixel value in the subspace, a coefficient storing part that outputs from the index signal an interpolation coefficient of a lattice point positioned at a top of the corresponding subspace, and an interpolating part that obtains an output pixel value by an interpolating processing from the interpolation coefficient and the delta signal and outputs the output pixel value. The device also has a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given, an input buffer that temporarily stores in pairs the index signal and the delta signal that are outputted respectively from the index converting part and the delta converting part, and then, outputs the pair, an out-of-order controlling part that gives an instruction to the input buffer to read out the index signal temporarily stored therein and an instruction to the coefficient cache to read out the index signal temporarily stored therein, and then, compares the index signals with each other that are read out respectively from the input buffer and the coefficient cache, judges that the interpolation processing can be performed by using the cached interpolation coefficient when the index signals coincide with each other, gives an instruction to read out the pair of index signal and the delta signal from the input with a priority given to the signal that can be interpolated, and outputs the signal to the interpolating part, and an output buffer that temporarily stores the interpolated output pixel value at a position corresponding to the position designated in the instruction by the out-of-order controlling part to the input buffer to read out and output the output pixel value in the same order as that inputted by the pixel inputting part.

This construction follows the out-of-order method. The hit ratio can positively be improved by reading out first the coefficient from the hit index.

According to another aspect of the present invention, the color converting device has a pixel value inputting part that inputs an input pixel value to a main body of the color converting device, an index converting part that outputs from the input pixel value an index signal showing a subspace to which the input pixel value belongs, and a delta converting part that outputs from the input pixel value a delta signal showing a position of the input pixel value in the subspace. The device also has a coefficient storing part that outputs from the index signal an interpolation coefficient of a lattice point positioned at a top of the corresponding subspace. The interpolation coefficient for the close lattice point in an input color space is stored in a close address in a memory-address space. The device further has an interpolating part that obtains an output pixel value by an interpolating processing from the interpolation coefficient and the delta signal and outputs the output pixel value, and a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given.

This construction follows the bit mixing method. The hit ratio can be improved by reflecting the correlation of a color between the adjacent pixels to the memory-address.

According to another aspect of the present invention, the color converting device has a pixel value inputting part that inputs an input pixel value to a main body of the color converting device, a scan order converting part that changes the order of the input pixel value to increase a correlation between pixels and outputs the pixel value, an index converting part that outputs from the input pixel value an index signal showing a subspace to which the input pixel value belongs, a delta converting part that outputs from the input pixel value a delta signal showing a position of the input pixel value in the subspace, and a coefficient storing part that outputs from the index signal an interpolation coefficient of a lattice point positioned at a top of the corresponding subspace. The device also has an interpolating part that obtains an output pixel value by an interpolating processing from the interpolation coefficient and delta signal and outputs the output pixel value, a scan order reverse converting part that reversely converts an order of the output pixel value and outputs the output pixel value in the order same as the input pixel value outputted by the pixel inputting part, and a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given.

This construction follows the scan order changing method, and performs a processing in the scan order for improving the hit ratio.

According to another aspect of the present invention, the color converting device has a pixel value inputting part that inputs an input pixel value to a main body of the color converting device, an index converting part that outputs from the input pixel value an index signal showing a subspace to which the input pixel value belongs, a delta converting part that outputs from the input pixel value a delta signal showing a position of the input pixel value in the subspace, and a coefficient storing part that outputs from the index signal an interpolation coefficient of a lattice point positioned at a top of the corresponding subspace. The device also has an interpolating part that obtains an output pixel value by an interpolating processing from the interpolation coefficient and delta signal and outputs the output pixel value, a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given, and an input buffer that temporarily stores in pairs the index signal and the delta signal, and outputs the index signal and the delta signal in a manner of first-in-first-out.

This construction follows the pre-reading method and improves the hit ratio by precedently performing the reading-out.

According to another aspect of the present invention, the color converting device has a pixel value inputting part that inputs an input pixel value to a main body of the color converting device, an index converting part that outputs from the input pixel value an index signal showing a subspace to which the input pixel value belongs, a delta converting part that outputs from the input pixel value a delta signal showing a position of the input pixel value in the subspace, and a coefficient storing part that outputs from the index signal an interpolation coefficient of a lattice point positioned at a top of the corresponding subspace. The device also has an interpolating part that obtains an output pixel value by an interpolating processing from the interpolation coefficient and the delta signal and outputs the output pixel value, and a coefficient temporarily storing part that temporarily stores the interpolation coefficient read from the coefficient storing part and the corresponding index signal, outputs the interpolation coefficient instead of the coefficient storing part when an instruction for reading out the interpolation coefficient temporarily stored is given, while notifies the corresponding index signal to the controlling part when an instruction for reading out the interpolation coefficient not temporarily stored is given. The device further has an input buffer that temporarily stores in pairs the index signal and the delta signal that are outputted respectively from the index converting part and the delta converting part, and outputs the pair, a controlling part that gives an instruction to the input buffer to read out the index signal and the delta signal temporarily stored in a predetermined order, outputs the corresponding index signal to the coefficient storing part when an index signal not temporarily stored is notified from the coefficient temporarily storing part, and, upon receiving the corresponding interpolation coefficient from the coefficient storing part, causes the coefficient temporarily storing part to store the corresponding interpolation coefficient, and gives an instruction to the input buffer to output the corresponding index signal and the delta signal, and an output buffer that temporarily stores the interpolated output pixel value at a position corresponding to the position designated in the instruction by the out-of-order controlling part to the input buffer to read out, and outputs the output pixel value in the same order as that inputted by the pixel inputting part.

This construction follows the out-of-order method and improves the hit ratio like the former construction.

A color compensation is included in the color conversion in this specification.

BRIEF DESCRIPTION OF THE DRAWINGS

Preferred embodiments of a color converting device according to the present invention will be described in detail based on the drawings:

FIG. 6 is a block diagram showing a specific construction of the second embodiment;

DESCRIPTION OF THE PREFERRED EMBODIMENTS

Embodiments of the present invention will be explained hereinbelow.

First Embodiment

Figure 1:
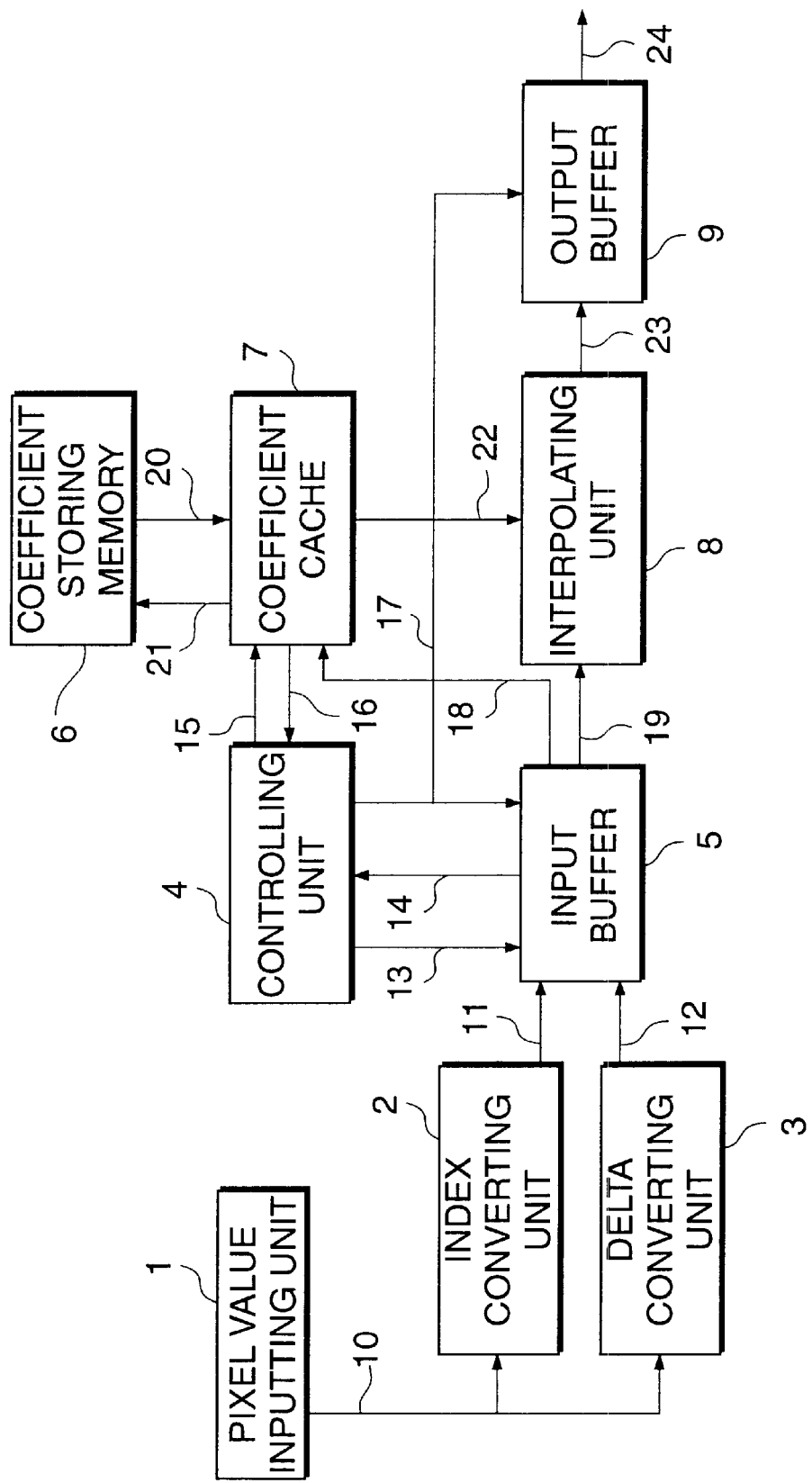
FIG. 1 is a block diagram showing a construction of the first embodiment (out-of-order method) of this invention.

This embodiment utilizes an out-of-order method. In FIG. 1, which shows a construction of this embodiment, a color conversion device is constructed to include a pixel value inputting unit 1, an outputting index converting unit 2, delta converting unit 3, out-of-order controlling unit 4, input buffer 5, coefficient storing memory 6, coefficient cache 7, interpolating unit 8 and output buffer 9.

The pixel value inputting unit 1 inputs an input pixel value 10 to the main body of the color conversion device. The index converting unit 2 outputs from the input pixel value 10 an index signal 11 showing a subspace to which the input pixel value belongs. The delta converting unit 3 outputs from the input pixel value 10 a delta signal 12 showing a position of the input pixel value in the subspace. The coefficient storing memory 6 outputs from an index signal 21 an interpolation coefficient 20 of a lattice point positioned at the top of the corresponding subspace. The interpolating unit 8 obtains an output pixel value 23 from the interpolation coefficient 22 and the delta signal 19 by an interpolation process and outputs the obtained value. The coefficient cache 7 temporarily stores an index signal 21 corresponding to the interpolation coefficient 20 that has once been read out from the coefficient memory 6. When the interpolation coefficient temporarily stored is read out, the coefficient cache 7 outputs an interpolation coefficient 22 instead of the coefficient storing memory 6, while outputs the index signal 21 to the coefficient storing memory 6 and reads out the interpolation coefficient 20 when the interpolation coefficient not temporarily stored is read out. The input buffer 5 temporarily stores the index signal 11 and the delta signal 12 in pairs, and then, outputs an index signal 18 and a delta signal 19 in accordance with an instruction 17 from the out-of-order controlling unit 4. The out-of-order controlling unit 4 instructs the input buffer 5 (its instruction is shown by a numeral 13) to read out the index signal 14 that is temporarily stored as well as instructs the coefficient cache 7 (its instruction is shown by a numeral 15) to read out the index signal 16 temporarily stored, and then, compares both signals. If both signals coincide with each other, the out-of-order controlling unit 4 judges that the interpolation can be performed by the cached interpolation coefficient, so that it gives an instruction (shown by a numeral 17) to take out the signal first from the one that can be interpolated from the input buffer and causes the interpolation unit to output. The output buffer 9 temporarily stores the output pixel value 23 that is interpolated corresponding to the position where the controlling unit 4 instructs the input buffer to take out (its instruction is shown by a numeral 17), and outputs an output pixel value 24 in the same order as the input by the pixel inputting unit 1.

Figure 2:
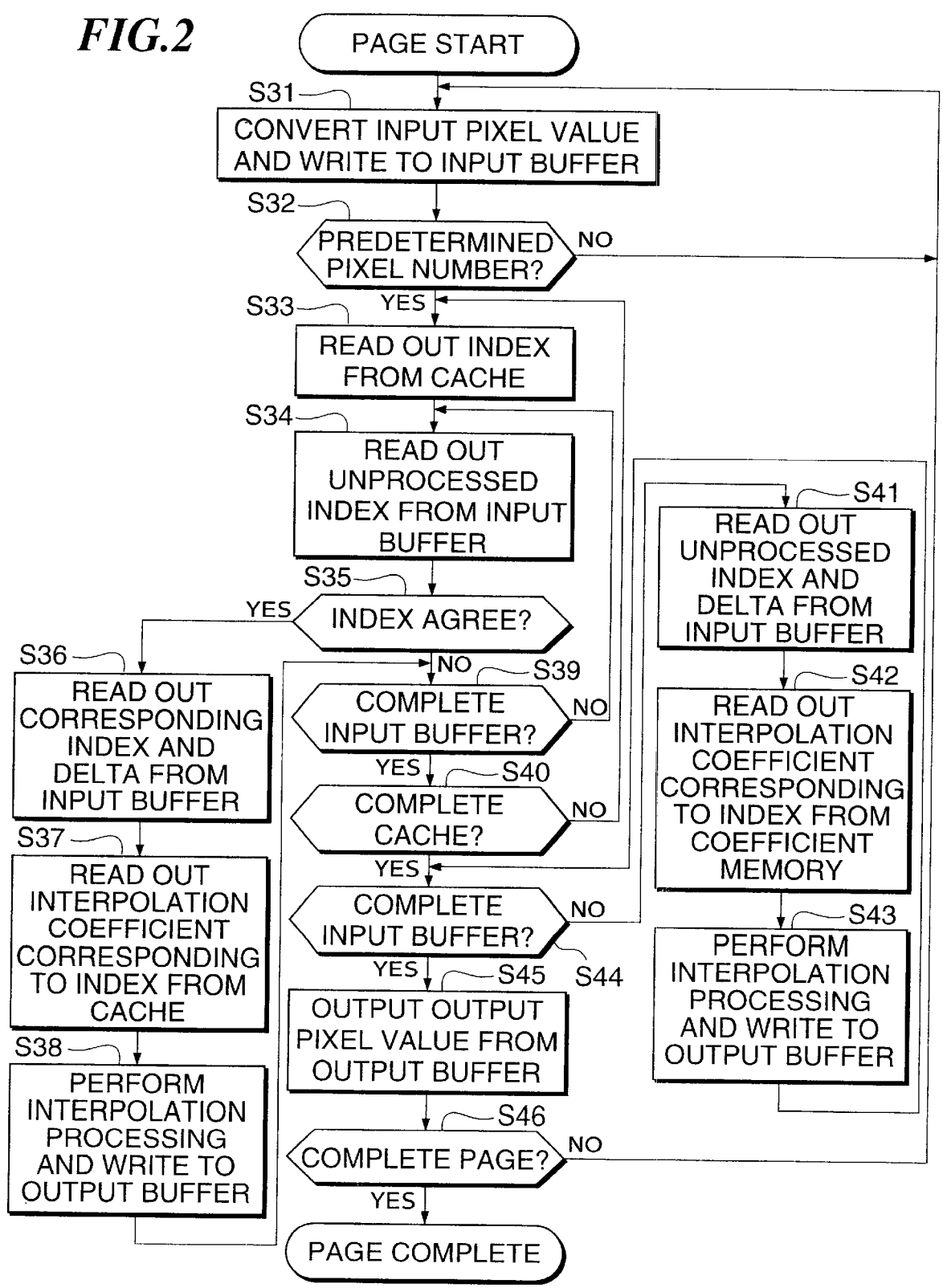
FIG. 2 is a flowchart explaining an operation of the first embodiment.

Subsequently, an operation will be explained with reference to FIG. 2 which shows a flow of the operation for performing a color conversion process of an input pixel value of one page and outputting the color-converged pixel value.

[Step S31] The input pixel value 10 is read out from the pixel inputting part 1. The input pixel value 10 is converged to the index signal 11 at the index converting unit 2, and at the same time, the input pixel value 10 is converged into the delta signal 12 at the delta converting unit 3. Each of the index signal 11 and the delta signal 12 is written to the input buffer 5.

[Step S32] The number of the input pixel value processed at Step S31 is calculated to repeat the process of Step S31 until the input pixel value reaches the predetermined number.

[Step S33] The out-of-order controlling unit 4 instructs the coefficient cache 7 (its instruction is shown by the numeral 15) to output the index signal 16 that is temporarily stored.

[Step S34] The out-of-order controlling unit 4 instructs the input buffer 5 (its instruction is shown by the numeral 13) to output the index signal 14 that is temporarily stored.

[Step S35] The out-of-order controlling unit 4 compares the index signal 16 with the index signal 14 for judging whether they coinside with each other or not, i.e. , the interpolation process can be performed or not with the cached interpolation coefficient.

[Step S36] When the index signals coinside with each other at Step S35, the out-of-order controlling unit 4 instructs the input buffer 5 (its instruction is shown by the numeral 17) to read out the index signal 18 and the delta signal 19 corresponding to the same input pixel instructed at Step S34 (its instruction is shown by the numeral 13).

[Step S37] The coefficient cache 7 receives the index signal 18 to output the corresponding interpolation coefficient 22.

[Step S38] The interpolating unit 8 performs the interpolation process from the interpolation coefficient 22 and the delta signal 19, and then, outputs its result as the output pixel value 23, whereby the output pixel value 23 is written in the output buffer 9 corresponding to the instruction 17 from the out-of-order controlling unit 4. Specifically, the output pixel value is written in the output buffer 9 in the same order as the order of inputting the input pixel value by writing the output pixel value at the same position where it is taken out from the input buffer 5.

[Step S39] When the index signals do not coinside with each other at Step S35, the controlling unit 4 judges whether the comparison is executed by reading out all of the indexes from the input buffer 5. If the index not compared is left, the process moves to Step S34.

[Step S40] In case where the comparison is completed with respect to all indexes at Step S39, a judge is made whether all of the indexes are read out from the coefficient cache 7 for comparison. If the one not compared is left, the process moves to Step S33.

[(Step S44] In case where the comparison is completed with respect to all indexes at Step S40, a judge is made whether all of the indexes and deltas temporarily stored at the input buffer 5 are subject to the conversion process. If the one not converged is left, the process moves to Step S41.

[Step S41] The out-of-order controlling unit 4 instructs the input buffer 5 (its instruction is shown by the numeral 17) to read out the index 18 and delta 19 that has not been converged.

[Step S42] The coefficient cache 7 receives the index signal 18. If this index is the one not temporarily stored, the coefficient cache 7 outputs the index signal 21 to the coefficient storing memory 6, and further receives and temporarily stores the corresponding interpolation coefficient 20, and at the same time, outputs the interpolation coefficient 22 to the interpolating unit 8. If this index is the one temporarily stored, the coefficient cache 7 directly outputs the corresponding interpolation coefficient 22.

[Step S43] The same process as Step S38 is performed.

[Step S45] When all conversions are completed at Step S44, the output pixel value is outputted from the output buffer 9.

[Step S46] The judge is made whether the conversion process by one page is completed or not. The above-mentioned process is repeated until the conversion process by one page is completed.

Figure 3:
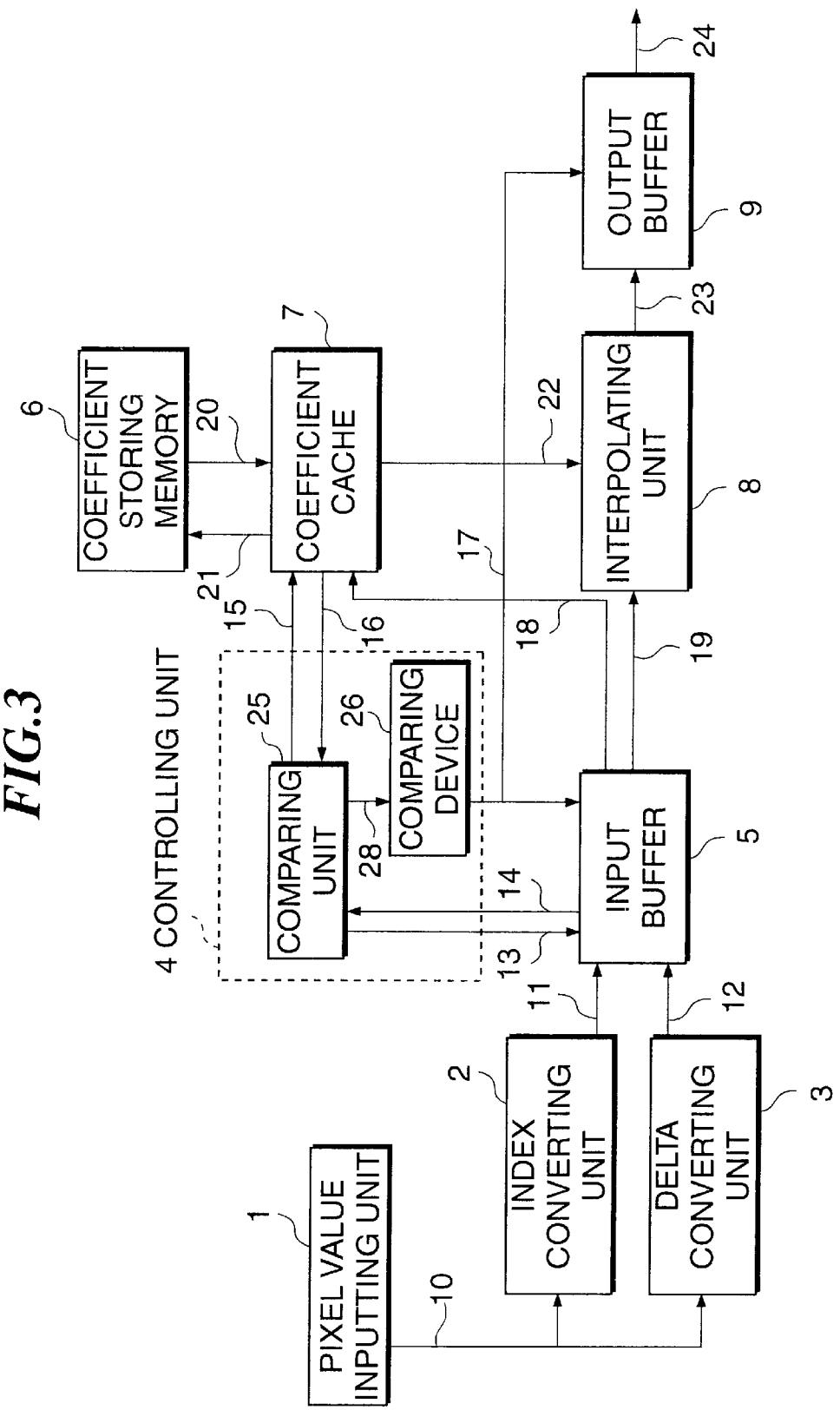
FIG. 3 is a block diagram showing a specific construction of the first embodiment.

FIG. 3 shows a specific constructional example (image processing device) of the first embodiment. This constructional example especially has the out-of-order controlling unit 4 comprising a comparing device 25 and a controlling unit 26. The image processing device of FIG. 3 is the one for performing a color conversion to CMYK signals 10 for printing that are inputted from the pixel value inputting unit 1 and for outputting the color-converged CMYK signals to an image output device 24 such as a color printer.

The inputted CMYK signals 10 are data of eight bits of each M, Y and K. Each data 10 of C, M, Y and K is inputted to the index converting unit 2 and the delta converting unit 3 for generating a table referring value 11 that is expressed by 20 bits by using the major five bits of each data and a subspace position 12 that is expressed by 12 bits by using the minor three bits of each data, both of which are stored in the input buffer 5 in which a plurality of table referring values 11 and the subspace positions 12 in pairs can be stored.

The pair of the table referring value 21 used formerly for the reference of the coefficient storing memory 6 and the interpolation coefficient 20 obtained as a result of the reference is stored in the coefficient cache 7. The comparing device 25 inputs 28 to the controlling unit 26 the truth whether the table referring value stored in the input buffer 5 is included in the coefficient cache 7 or not, while the controlling unit 26 controls the input buffer 5 so as to priorly input the table referring value 11 having the table referring value included in the coefficient cache 7 and the subspace position 12 to the coefficient cache 7 and the interpolation processing unit 19.

In case where the coefficient cache 7, with respect to the inputted table referring value 18, stores the pair of the table referring value having the same table referring value and the interpolation coefficient, it inputs the stored interpolation coefficient to the interpolation processing unit 8, while it receives and inputs the interpolation coefficient corresponding to the table referring value from the coefficient storing memory 6 as well as stores the pair of the interpolation coefficient newly received and the table referring value in the case of not storing the above-mentioned pair.

The interpolation processing unit 8 generates the color-converged CMYK signals 23 from the inputted interpolation coefficient 22 and the internal position 19, and then, outputs the generated signal to the output buffer 9.

The output buffer 9 receives the control 17 from the controlling unit 26 for restoring the order of the data changed by the input buffer 5.

That concludes the explanation of the out-of-order method.

Second Embodiment

Figure 4:
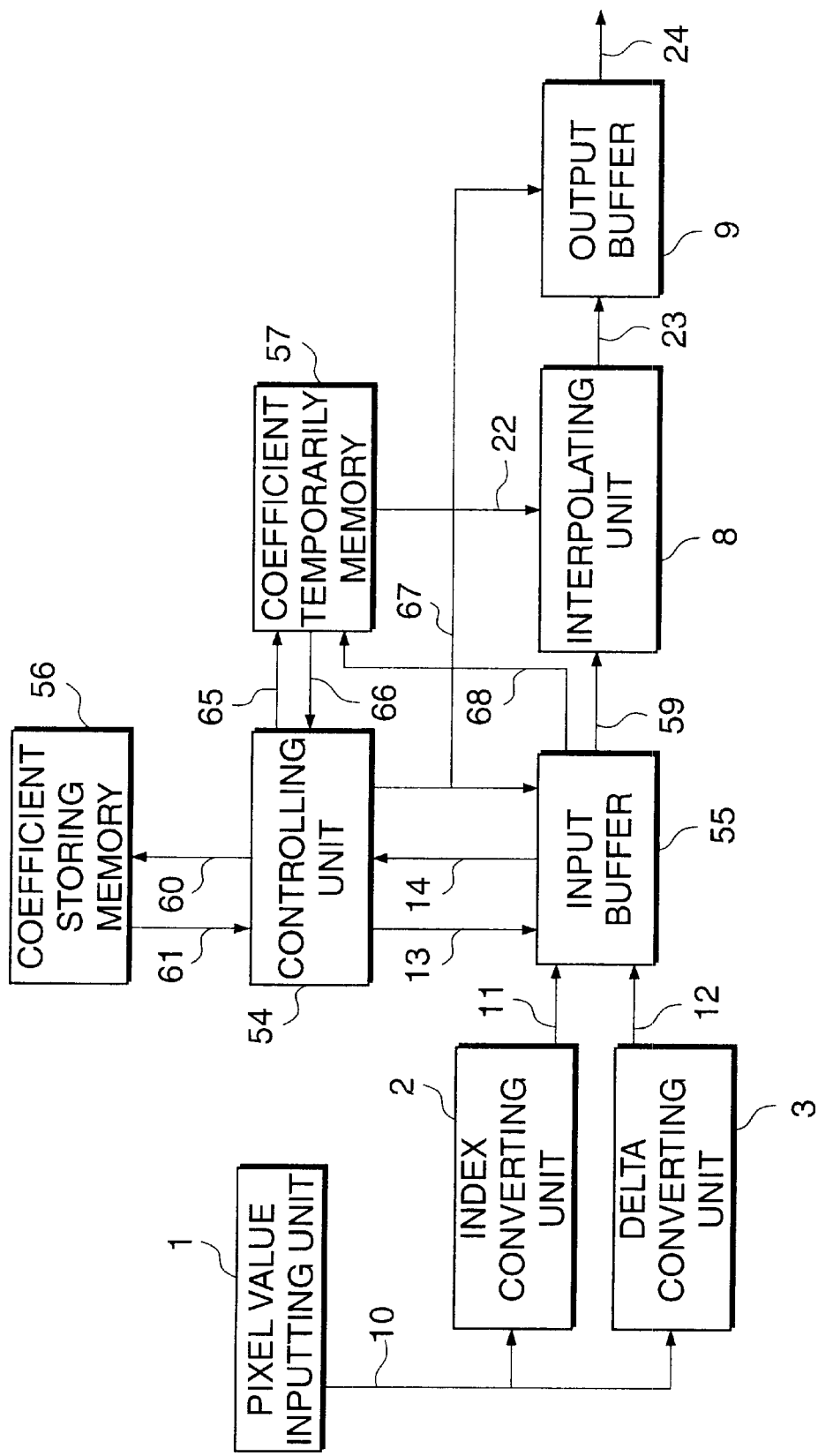
FIG. 4 is a block diagram showing a construction of the second embodiment (other out-of-order method) of this invention.

FIG. 4 shows the construction of the second embodiment of the present invention. This embodiment implements another out-of-order method. It is to be noted that the portions in FIG. 4 same as those in FIG. 1 are denoted by the same corresponding numerals.

In FIG. 4, a color conversion device of the second embodiment is constructed to include the pixel value inputting unit 1, index converting unit 2, delta converting unit 3, interpolating unit 8, output buffer 9, controlling unit 54, input buffer 55, coefficient storing memory 56 and coefficient temporarily storing unit 57.

The pixel value inputting part 1 inputs an input pixel value 10 to the main body of the color conversion device in this construction also. The index converting unit 2 outputs from the input pixel value 10 the index signal 11 showing the subspace to which the input pixel value belongs. The delta converting unit 3 outputs from the input pixel value 10 the delta signal 12 showing a position of the input pixel value in the subspace. The coefficient storing memory 56 outputs from an index signal 61 an interpolation coefficient 60 of a lattice point positioned at the top of the corresponding subspace. The interpolating unit 8 obtains the output pixel value 23 from the interpolation coefficient 22 and a delta signal 69 by an interpolation process and outputs the obtained value. The coefficient temporarily storing unit 57 temporarily stores the index signal 61 corresponding to the interpolation coefficient 60 that has once been read out from the coefficient storing memory 56. When the interpolation coefficient temporarily stored is read out, the coefficient temporarily storing unit 57 outputs the interpolation coefficient 22 instead of the coefficient storing memory 56, while notices to the controlling unit 54 the corresponding index signal 66 when the interpolation coefficient not temporarily stored is read out. The input buffer 55 temporarily stores the index signal 11 and the delta signal 12 in pairs, and then, outputs an index signal 68 and a delta signal 69 in accordance with an instruction 67 from the controlling unit 54. The controlling unit 54 instructs the input buffer 55 (its instruction is shown by a numeral 67) to read out the index signal 68 that is temporarily stored and the delta signal 69 in the predetermined order. In case where the index signal 66 that has not been temporarily stored is noticed from the coefficient temporarily storing unit 57, the controlling unit 54 outputs the index signal 61 corresponding to the coefficient storing memory 56 and causes the coefficient temporarily storing unit 57 to temporarily store the corresponding interpolation coefficient 65 upon receiving the corresponding interpolation coefficient 60 from the coefficient storing memory 56, and instructs the input buffer 55 (its instruction is shown by a numeral 67) to output the corresponding index signal 68 and delta signal 69. The output buffer 9 temporarily stores the output pixel value 23 that is interpolated corresponding to the position where the controlling unit 54 instructs the input buffer 55 to take out (its instruction is shown by a numeral 67), and outputs an output pixel value 24 in the same order as the input by the pixel inputting part 1.

Figure 5A:
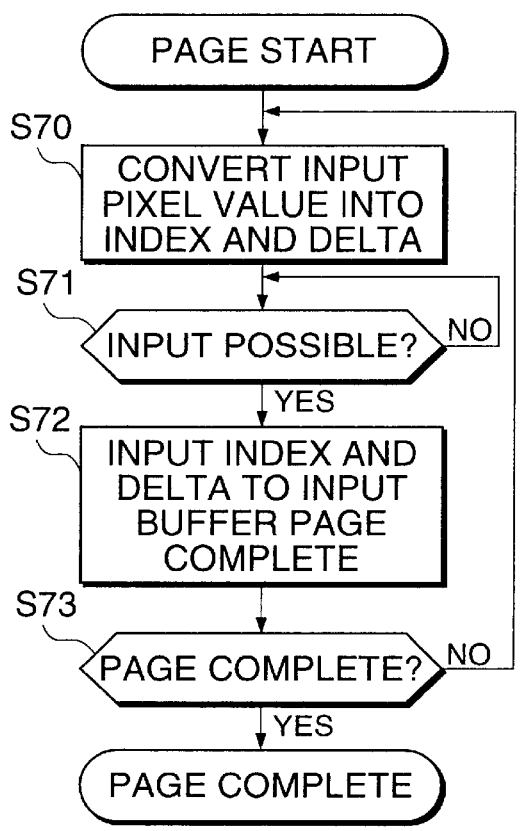
FIGS. 5A–5C are flowcharts explaining an operation of the second embodiment.
Figure 5B:
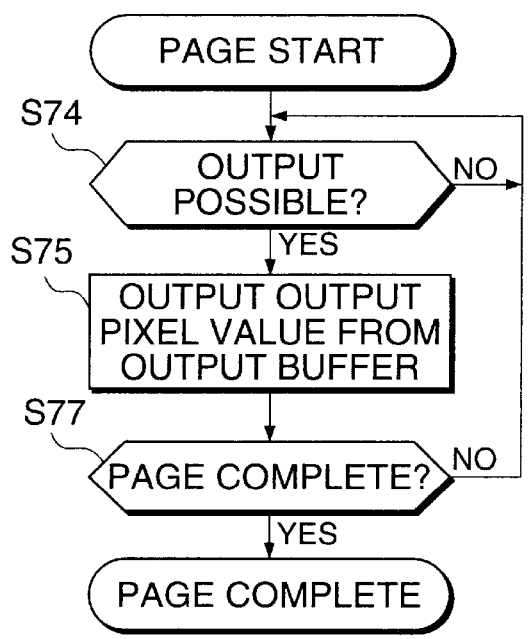
Figure 5C:
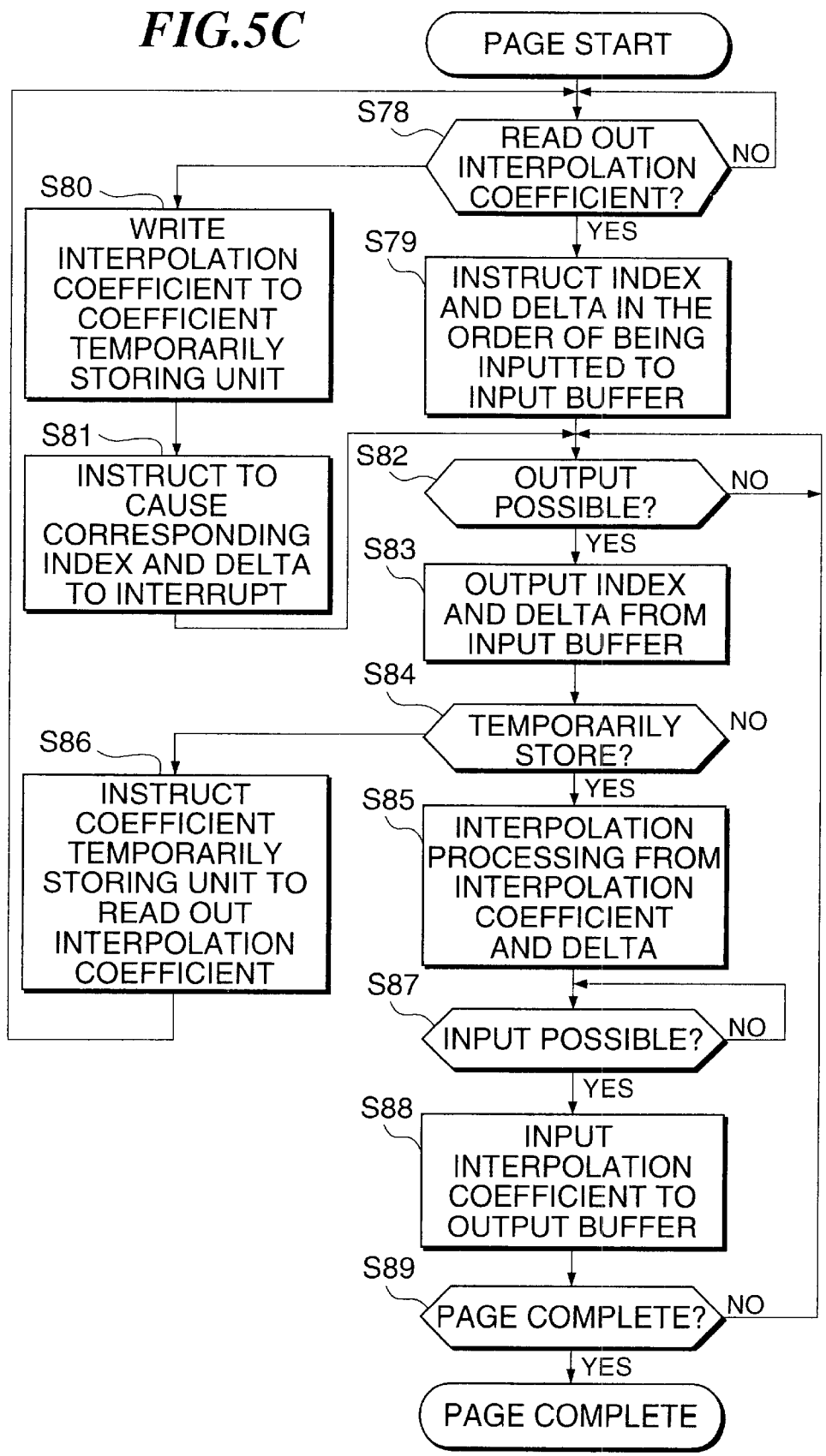

Subsequently, the operation of the second embodiment will be explained with reference to FIG. 5.

[Step S70] The input pixel value 10 is converted into the index signal 11 and the delta signal 12

[Step S71] The empty condition of the input buffer 55 is confirmed. If the input is possible, the process moves to Step S72.

[Step S72] The index signal 11 and the delta signal 12 are inputted to the input buffer 55.

[Step S73] The above-mentioned process is repeated until all of the input pixels composing a page is processed.

[Step S74] The empty condition of the output buffer 9 is confirmed. If the output is possible, the process moves to Step S75.

[Step S75] The output pixel value 24 is outputted from the output buffer 9

[Step S77] The above-mentioned process is repeated until all of the output pixels composing a page is processed at Step S75.

[Step S78] The reading out of the interpolation coefficient instructed to the coefficient storing memory 56 from the controlling unit 54 to read out is judged to be completed or not. If not completed, the process moves to Step S79.

[Step S79] The index signal 68 and the delta signal 69 are instructed from the input buffer 55 in the predetermined order. (its instruction is shown by the numeral 67).

[Step S80] If completed at Step S78, the index signal 65 corresponding to the read-out interpolation coefficient is temporarily stored in the coefficient temporarily storing unit 57. The process further moves to Step S81.

[Step S81] The index signal 68 and the delta signal 69 corresponding to the read-out interpolation coefficient are instructed (its instruction is shown by the numeral 67).

[Step S82] The index signal 68 and the delta signal 69 that are directed by the instruction 67 are confirmed to be capable of being read out from the input buffer 55, and then, the process moves to Step S83.

[Step S83] The index signal 68 and the delta signal 69 are actually read out.

[Step S84] The interpolation coefficient corresponding to the index signal 68 is judged to be temporarily stored in the coefficient temporarily storing unit 56. If temporarily stored, the process moves to Step S85.

[Step S85] The interpolation coefficient 22 is read out from the coefficient temporarily storing unit 57, and inputted, with the delta signal 69 that is already outputted from the input buffer 55, to the interpolating unit 8 that generates and outputs the output pixel value 23.

[Step S86] If not temporarily stored at Step S84, the coefficient temporarily storing unit 57 notices the corresponding index signal 66 to the controlling unit 54 that gives the instruction 61 to read out the interpolation coefficient corresponding to the index signal 66.

[Step S87] The empty condition of the output buffer 9 is confirmed. If the input is possible, the process moves to Step S88.

[Step S88] The output pixel value 23 is inputted to the output buffer 9.

[Step S89] The process is repeated until all of the output pixel values composing a page is processed.

Further, the present invention will be explained taking an example where the CMYK signals 10 for printing that are inputted from the pixel value inputting unit 1 is subject to a color conversion and then, outputted (its output is shown by the numeral by 24) to an image output device such as a color printer.

Each of the inputted CMYK signals 10 is eight bit data. Each data of C, M, Y and K 10 is inputted to the index converting unit 2 and the delta converting unit 3, whereby the table referring value 11 represented by 20 bits by a major five bits of each data and the subspace position 12 represented by 12 bits by a minor three bits of each data are generated. The generated table referring value 11 and the subspace position 12 are stored in the input buffer 5 that can store a plurality of a pair of the table referring value 11 and the subspace position 12.

The input buffer 5 inputs a table referring value 68 to the coefficient cache 57 and a subspace position 69 to the interpolation processing unit 8.

The pair of the table referring value 66 used before for the reference of the coefficient storing memory 56 and the interpolation coefficient 65 obtained by the result of the reference is stored in the coefficient cache 57. If the inputted table referring value is stored in the coefficient cache 57, the coefficient cache 57 outputs the corresponding interpolation coefficient 22 to the interpolation processing unit.

If the table referring value inputted to the coefficient cache 57 is not stored in the coefficient cache 57, the table referring value 66 is inputted to the controlling unit which inputs the table referring value 61 to the coefficient storing memory 56 and receives the interpolation coefficient 60. The controlling unit 54 inputs the interpolation coefficient 60 to the coefficient cache 57.

The coefficient cache 57 inputs the inputted interpolation coefficient to the interpolating processing unit 8, as well as stores the pair of inputted interpolation coefficient 65 and the table referring value 66.

The interpolation processing unit 8 generates the CMYK signals 23 which are color-converted from the inputted interpolation coefficient 22 and the subspace position 69 by an interpolation calculation, and inputs the resultant to the output buffer 9. The input buffer 55 continues to output the table referring value 68 and the subspace position 69 with respect to a new input pixel value during from the time when the table referring value 61 is inputted to the coefficient storing memory to the time when the interpolation coefficient 60 is inputted to the controlling unit 54. Therefore, the order of the color-converted CMYK signals 23 outputted from the interpolating processing unit 8 is different from the order of the CMYK signals 10 inputted from the pixel inputting unit 1.

The output buffer 9 restores by receiving the control of the controlling unit 54 such that the order of the output signal data becomes the same as the order of the input signal data.

Subsequently, a specific constructional example of the second embodiment will be explained with reference to FIG. 6. The portions in FIG. 6 corresponding to those in FIG. 4 are denoted by the corresponding numerals. In this example, the input buffer 55 inputs the 8 bit data. Specifically, the input buffer 55 receives major four bits as the index and minor four bits as the delta signal with respect to the YMCK.

Four (YMCK) 8 bit data are received for one pixel. The input buffer and output buffer are addressed with a ring address to circularly be utilized. The input buffer 55 and the output buffer 9 can store the index, delta signal and output color data with respect to four pixels for the sake of explanatory convenience in the example of the figure. In the condition of the figure, the indexes (4 bits ·4), delta signals (4 bits ·4) and the output color data of zeroth, first, second and third pixel are memorized at the address of A0, A1, A2 and A3 of the input buffer 55.

Then, the output color data is memorized at the address of A1, A1, A2 and A3 of the output buffer 9. The inputting order (0, 1, 2, 3) is displayed at the inside of each of the input buffer 55 and the output buffer 9. In this example, the coefficient of the color data of the first pixel is not stored in the coefficient storing memory, so that the inputting order thereof is deferred. Specifically, the index and delta signal are inputted in the order of zeroth, second, first and third pixels. The output color data is inputted in the corresponding order in accordance with this, whereby the output color data is outputted in the correct order.

Third Embodiment

Next, the third embodiment implementing a bit mixing method will be explained.

Figure 7:
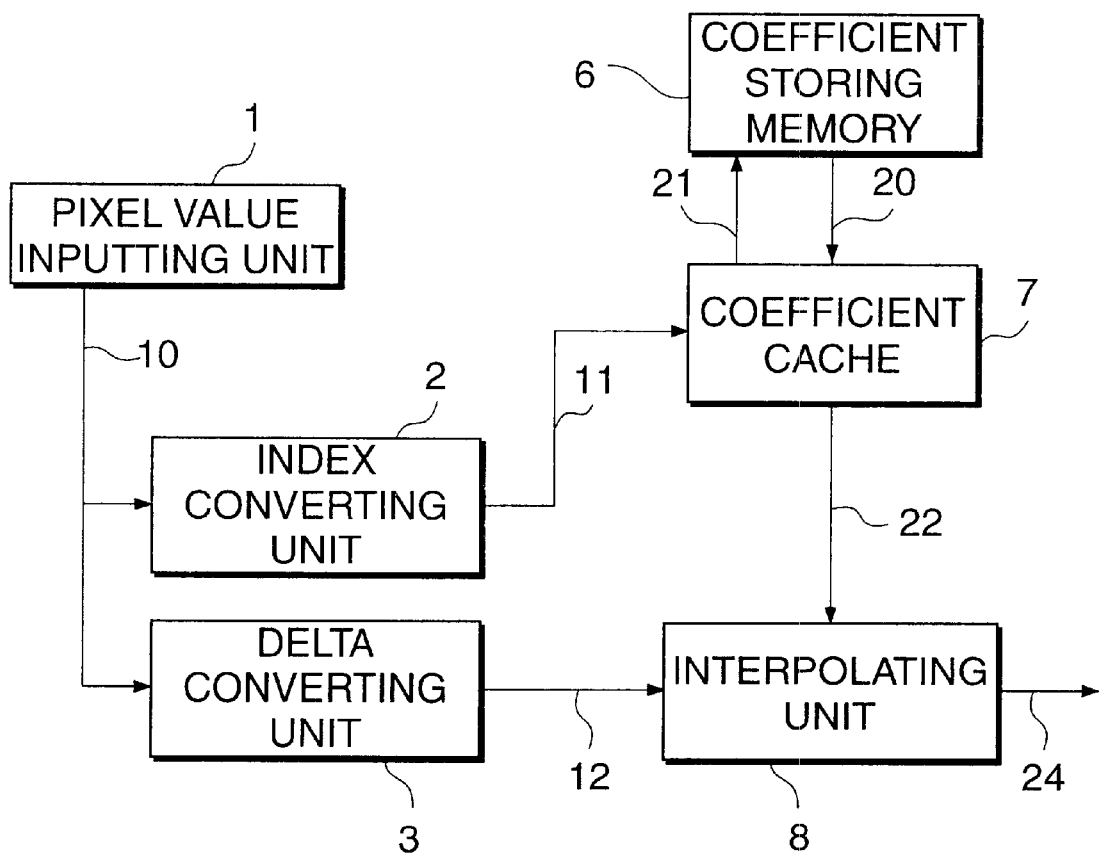
FIG. 7 is a block diagram showing a construction of the third embodiment (bit mixing method) of this invention.

FIG. 7 shows a construction of a color converting device of the third embodiment. The portions in this figure corresponding to the portions in FIG. 1 are denoted by the corresponding numerals. In FIG. 7, the color converting device is constructed to include the pixel value inputting unit 1, index converting unit 2, delta converting unit 3, coefficient storing memory 6, coefficient cache 7 and interpolating unit 8. In this construction also, the pixel value inputting unit 1 inputs the input pixel value 10 to the main body of the color conversion device. The index converting unit 2 outputs from input pixel value 10 the index signal 11 showing the subspace to which the input pixel value belongs. The delta converting unit 3 outputs from the input pixel value 10 the delta signal 12 showing a position of the input pixel value in the subspace. The coefficient storing memory 6 outputs from the index signal 21 the interpolation coefficient 20 of a lattice point positioned at the top of the corresponding subspace. The interpolating unit 8 obtains the output pixel value 23 from the interpolation coefficient 22 and the delta signal 12 by an interpolation process and outputs the obtained value. The coefficient cache 7 temporarily stores the index signal 21 corresponding to the interpolation coefficient 20 that has once been read out from the coefficient memory 6. When the interpolation coefficient temporarily stored is read out, the coefficient cache 7 outputs the interpolation coefficient 22 instead of the coefficient storing memory 6, while outputs the index signal 21 to the coefficient storing memory 6 and reads out the interpolation coefficient 20 when the interpolation coefficient not temporarily stored is read out. In particular, the coefficient storing memory 6 stores the close lattice point in the input color space in the close address in a memory address space of the coefficient storing memory.

Figure 8:
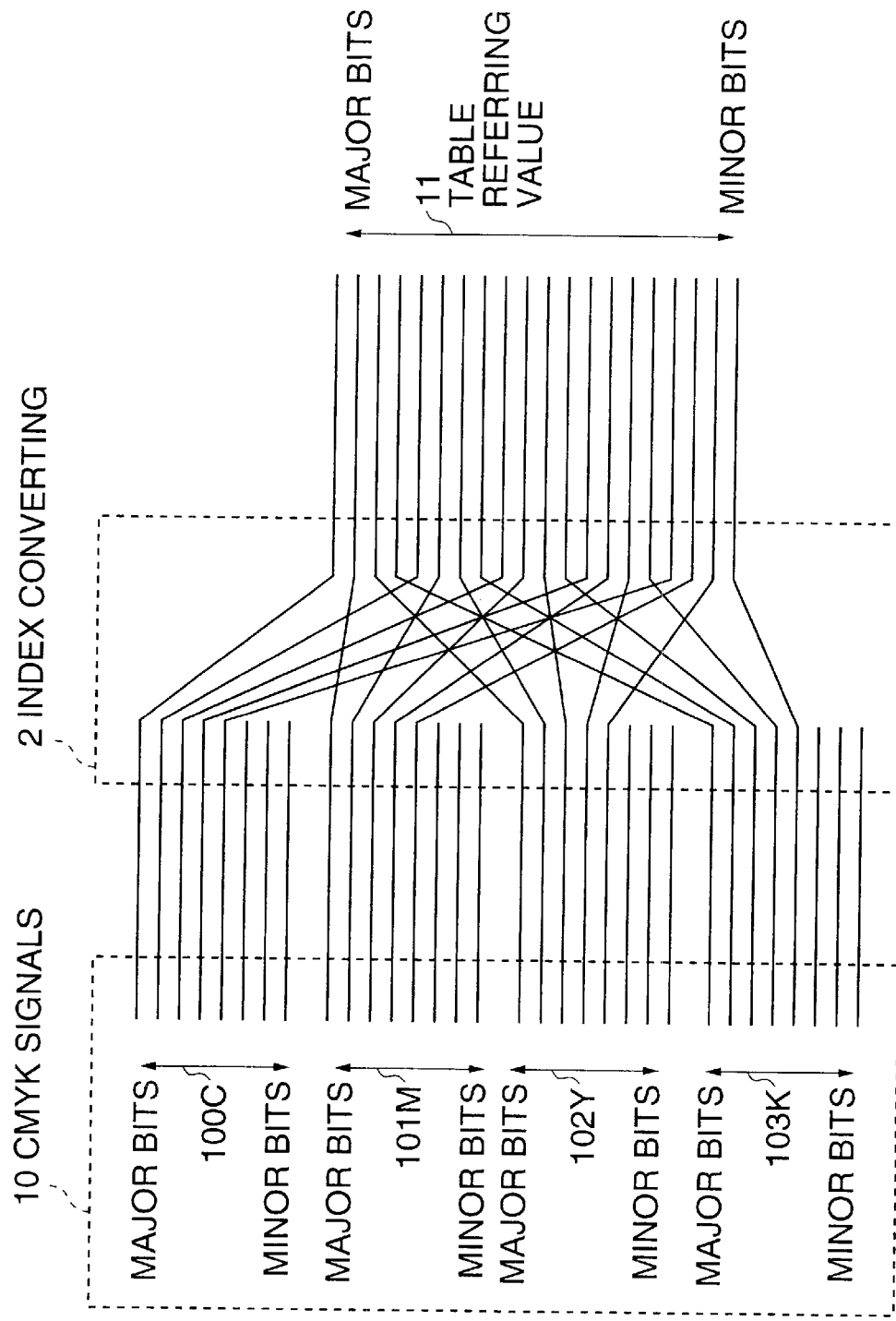
FIG. 8 is a view specifically explaining the third embodiment.

FIG. 8 shows one example of the construction of the address in the coefficient storing memory. This example is a mechanism for generating by the index converting unit 2 the table referring value 11 from major five bits of each C, M, Y and K of the CMYK signals 10 comprising C, M, Y and K of 8 bits. The major five signal lines of each signal line of C, M, Y and K are alternately mixed to thereby be converted into the signal line for outputting the table referring value 11.

Fourth Embodiment

Figure 9:
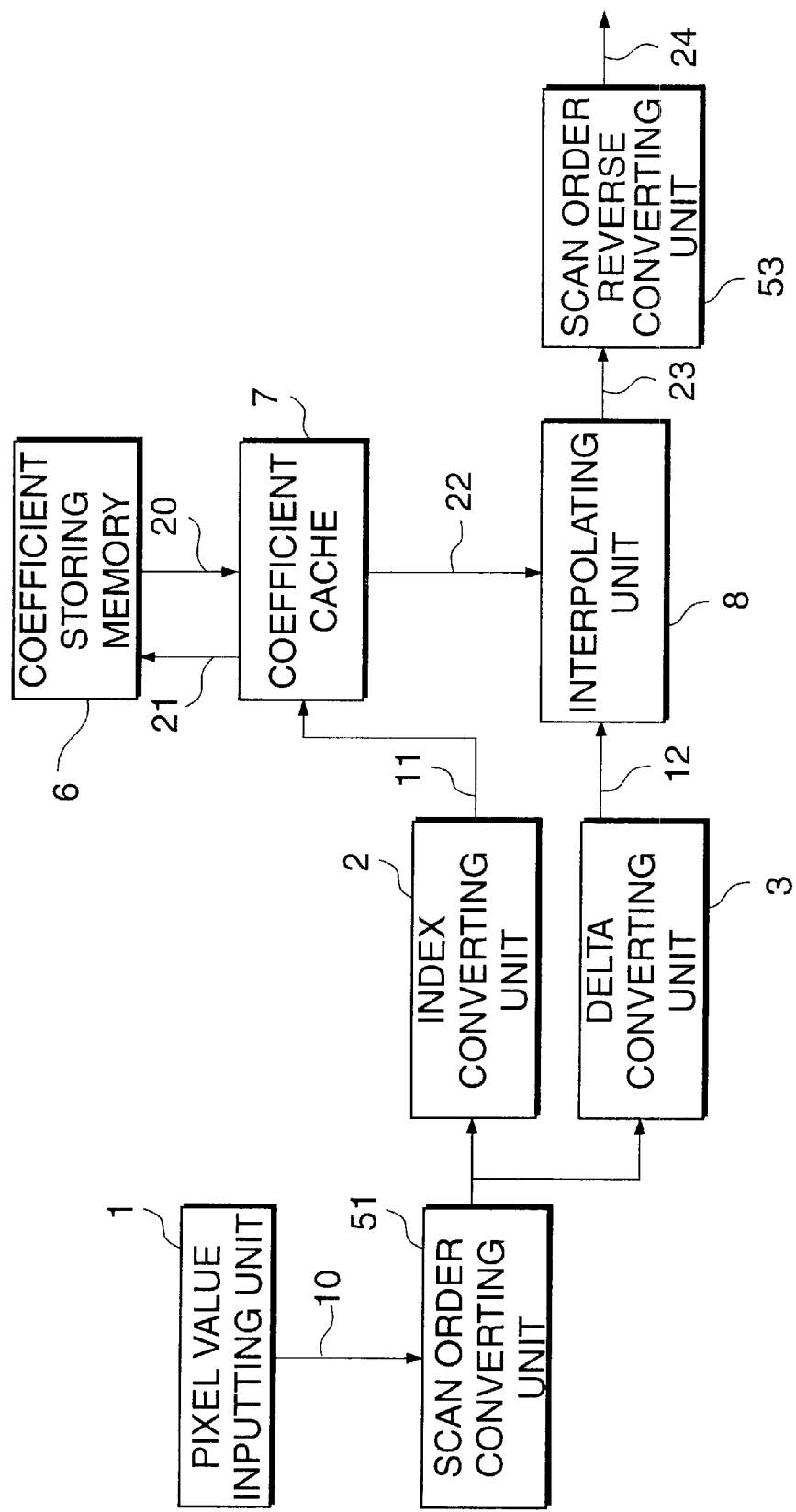
FIG. 9 is a block diagram showing a construction of the fourth embodiment (scan converting method) of this invention.

Subsequently, the fourth embodiment implementing a scan order changing method will be explained. FIG. 9 shows a construction of the color converting device of the fourth embodiment. The portions in this figure corresponding to the portions in FIG. 1 are denoted by the corresponding numerals. In FIG. 9, the color converting device is constructed to include the pixel value inputting unit 1, index converting unit 2, delta converting unit 3, coefficient storing memory 6, coefficient cache 7, interpolating unit 8, scan order converting unit 51 and scan order reverse converting unit 53. In this construction also, the pixel value inputting unit 1 inputs the input pixel value 10 to the main body of the color conversion device. The scan order converting unit 51 changes the order of the input pixel value 10 and outputs the pixel value 52. The index converting unit 2 outputs from an input pixel value 52 the index signal 11 showing the subspace to which the input pixel value belongs. The delta converting unit 3 outputs from the input pixel value 10 the delta signal 12 showing a position of the input pixel value in the subspace. The coefficient storing memory 6 outputs from the index signal 21 the interpolation coefficient 20 of a lattice point positioned at the top of the corresponding subspace. The interpolating unit 8 obtains the output pixel value 23 from the interpolation coefficient 22 and the delta signal 12 by an interpolation process and outputs the obtained value. The scan order reverse converting unit 53 performs a reverse conversion such that the order of the output pixel value 23 becomes the order of outputting from the pixel inputting unit 1, and then, outputs the output pixel value 54. The coefficient cache 7 temporarily stores the index signal 21 corresponding to the interpolation coefficient 20 that has once been read out from the coefficient memory 6. When the interpolation coefficient temporarily stored is read out, the coefficient cache 7 outputs the interpolation coefficient 22 instead of the coefficient storing memory 6, while outputs the index signal 21 to the coefficient storing memory 6 and reads out the interpolation coefficient 20 when the interpolation coefficient not temporarily stored is read out.

Figure 10:
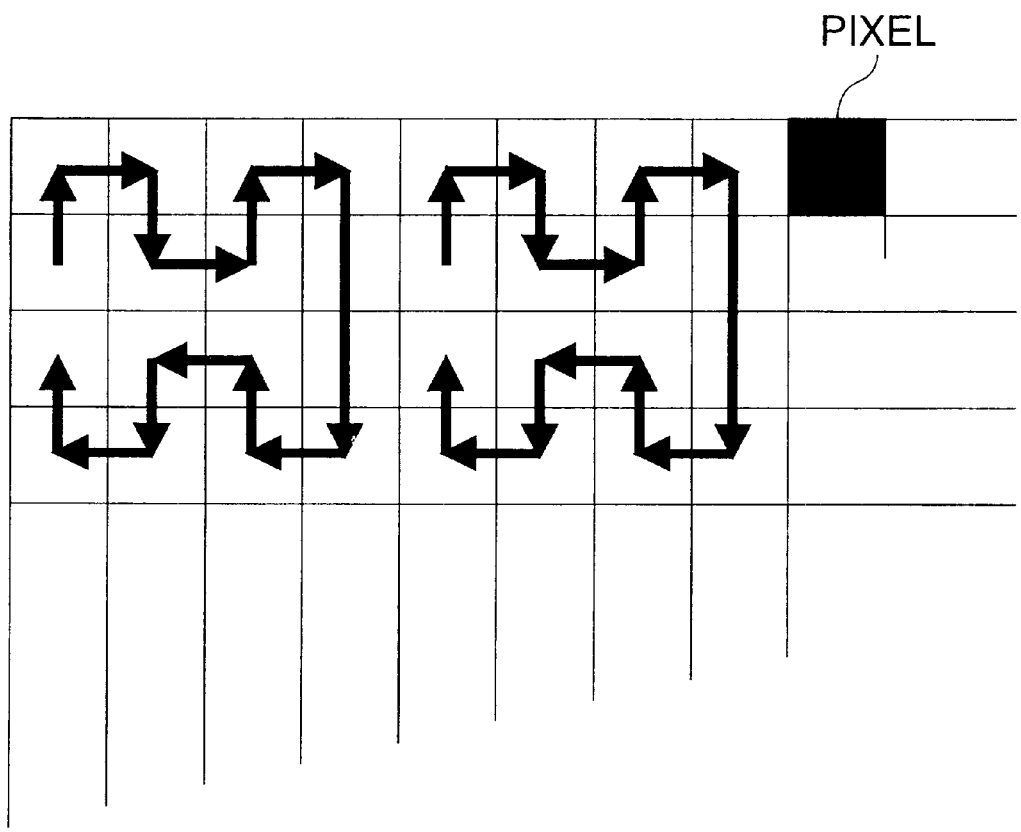
FIG. 10 is a view specifically explaining the fourth embodiment.

FIG. 10 shows one example of the order of the scan.

In this example, the scan order converting unit 51 scans a pixel every block of 4 lines and 4 columns unit with a scan line by line. In this way, the pixel is continuously and closely scanned, not with the scan line by line, to thereby increase a cache hit. The scan order reverse converting unit 53 sets back the order of the scan line by line and performs the output. The other operation is the same as that of the first embodiment.

Fifth Embodiment

Figure 11:
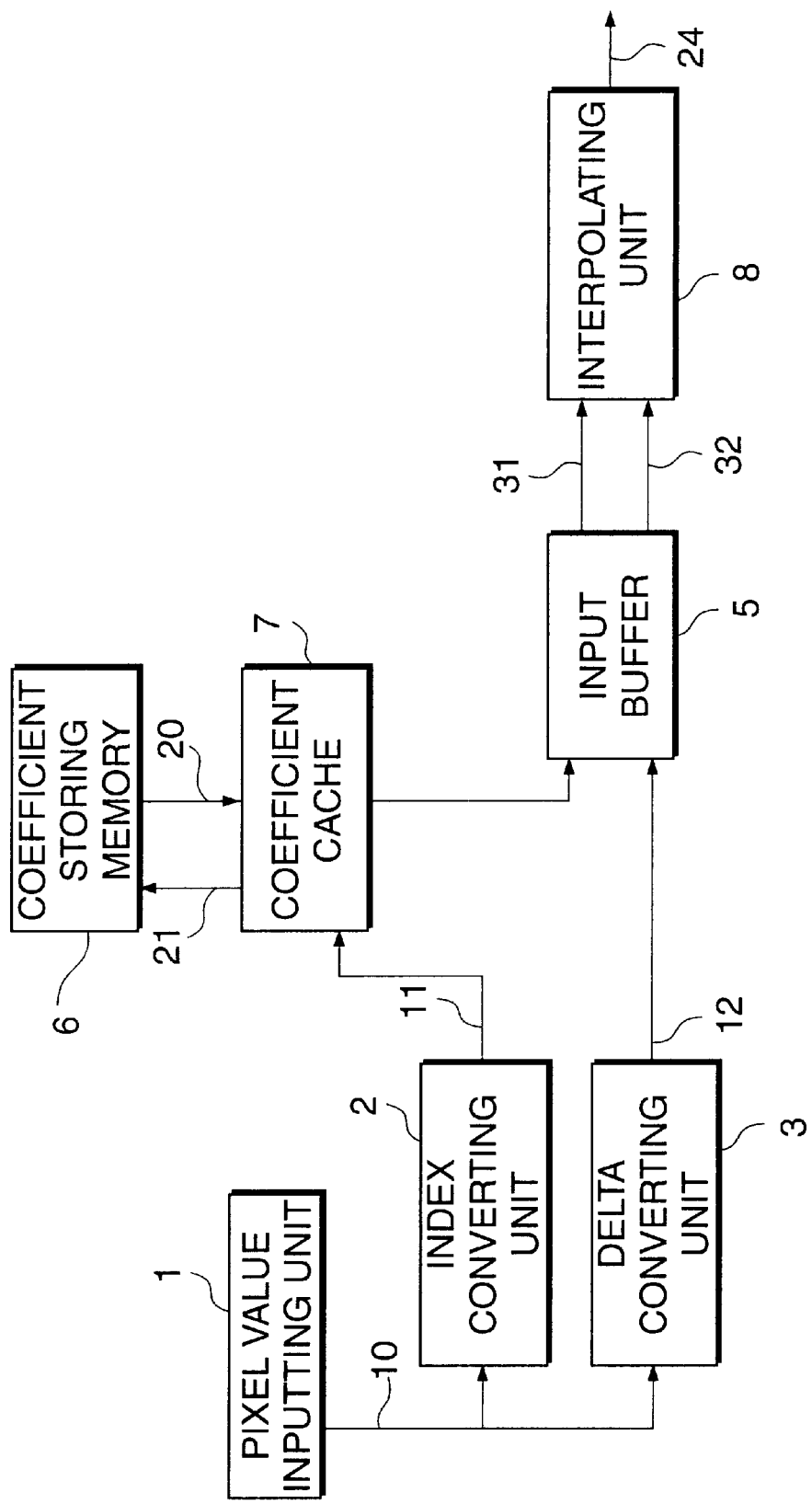
FIG. 11 is a block diagram showing a construction of the fifth embodiment (pre-reading method) of this invention.

Subsequently, the fifth embodiment implementing a pre-read method will be explained. FIG. 11 shows a construction of the color converting device of the fifth embodiment. The portions in this figure corresponding to the portions in FIG. 1 are denoted by the corresponding numerals. In FIG. 11, the color converting device is constructed to include the pixel value inputting unit 1, index converting unit 2, delta converting unit 3, coefficient storing memory 6, coefficient cache 7 and interpolating unit 8. In this construction also, the pixel value inputting unit 1 inputs the input pixel value 10 to the main body of the color conversion device. The index converting unit 2 outputs from the input pixel value 10 the index signal 11 showing the subspace to which the input pixel value belongs. The delta converting unit 3 outputs from the input pixel value 10 the delta signal 12 showing a position of the input pixel value in the subspace. The coefficient storing memory 6 outputs from the index signal 21 an interpolation coefficient 20 of a lattice point positioned at the top of the corresponding subspace. The interpolating unit 8 obtains the output pixel value 24 from an interpolation coefficient 31 and a delta signal 32 by an interpolation process and outputs the obtained value. The coefficient cache 7 temporarily stores an index signal 21 corresponding to the interpolation coefficient 20 that has once been read out from the coefficient memory 6. When the interpolation coefficient temporarily stored is read out, the coefficient cache 7 outputs the interpolation coefficient 22 instead of the coefficient storing memory 6, while outputs the index signal 21 to the coefficient storing memory 6 and reads out the interpolation coefficient 20 when the interpolation coefficient not temporarily stored is read out. The input buffer 5, that operates with a first-in-first-out, temporarily stores the pair of the index signal 11 and the delta signal 12 and outputs the index signal 31 and the delta signal 32.

Next, the present invention will further be explained taking an example where the CMYK signals 10 for printing that are inputted from the pixel value inputting unit 1 are subject to the color conversion and outputted 24 to the image outputting device such as a color printer.

Each of the inputted CMYK signals 10 is eight bit data. Each data of C, M, Y and K 10 is inputted to the index converting unit 2 and the delta converting unit 3, whereby the table referring value 11 represented by 20 bits by major five bits of each data and the subspace position 12 represented by 12 bits by minor three bits of each data are generated. The generated table referring value 11 is inputted to the coefficient cache 7 and the subspace position 12 are stored in the input buffer 5.

If the coefficient cache 7 stores the pair of the table referring value having the same table referring value as the inputted table referring value 11 and the interpolation coefficient, it inputs the storing interpolation coefficient to the input buffer 5. If not stored, the coefficient cache 7 receives the interpolation coefficient corresponding to the table referring value from the coefficient storing memory 6 and inputs the received one to the input buffer 5 as well as stores the pair of the newly received interpolation coefficient and the table referring value.

The input buffer 5 inputs the pair of the interpolation coefficient and the subspace position to the interpolating unit 8 that generates the CMYK signals 24 color-converted from the inputted interpolation coefficient 31 and the internal position 32 and outputs the resultant.

After inputting the pair of the interpolation coefficient and the subspace to the interpolating unit 8, the input buffer 5 outputs a pixel value requiring signal 50 to the pixel value inputting unit 1 so as to cause the pixel value inputting unit 1 to output a new pixel value. Then, the process for receiving the interpolation coefficient and the subspace position in the next pixel is advanced during when the interpolating unit 8 performs the interpolation calculation.

Figure 12:
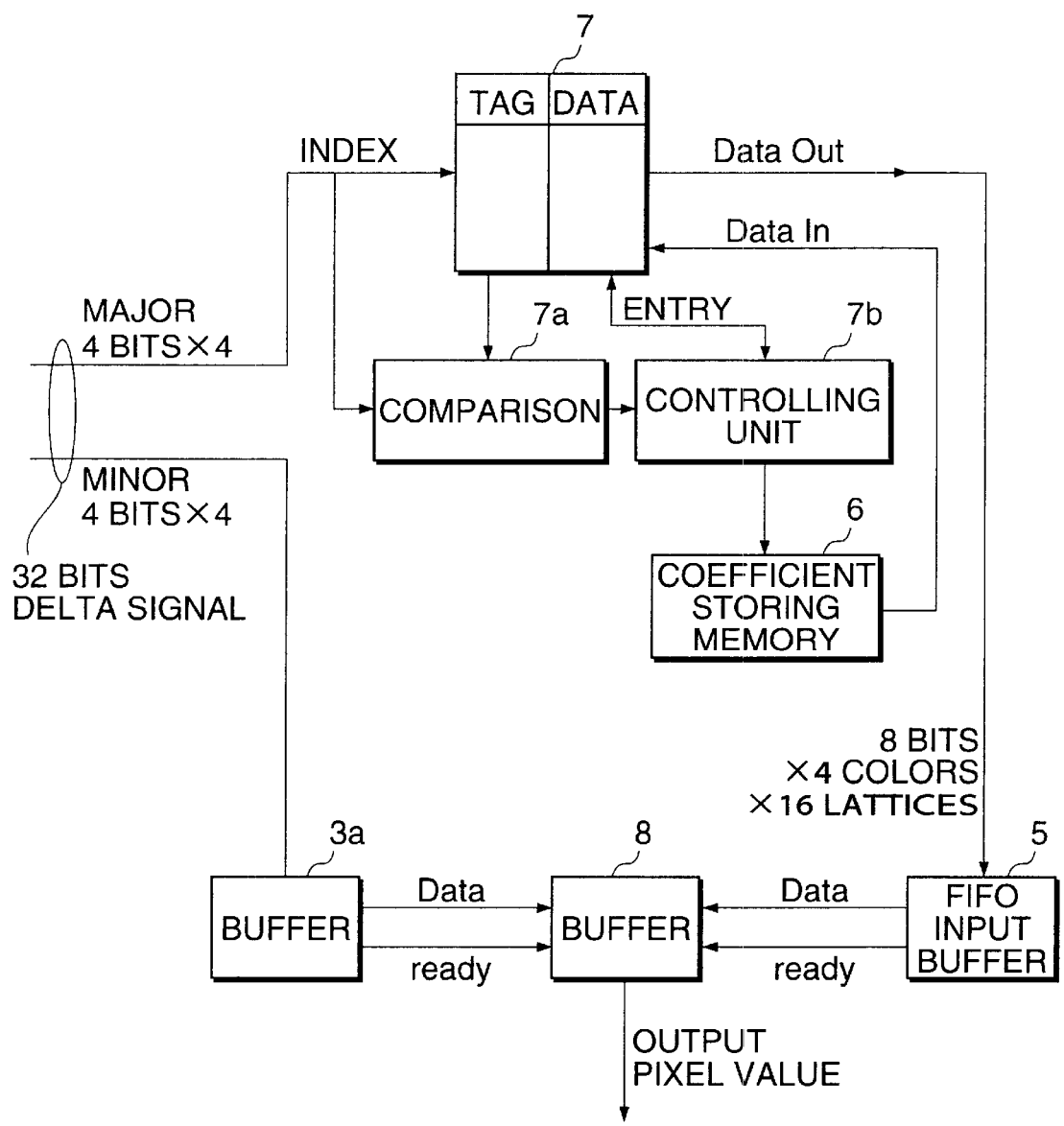
FIG. 12 is a block diagram showing a specific construction of the fifth embodiment.
Figure 13:
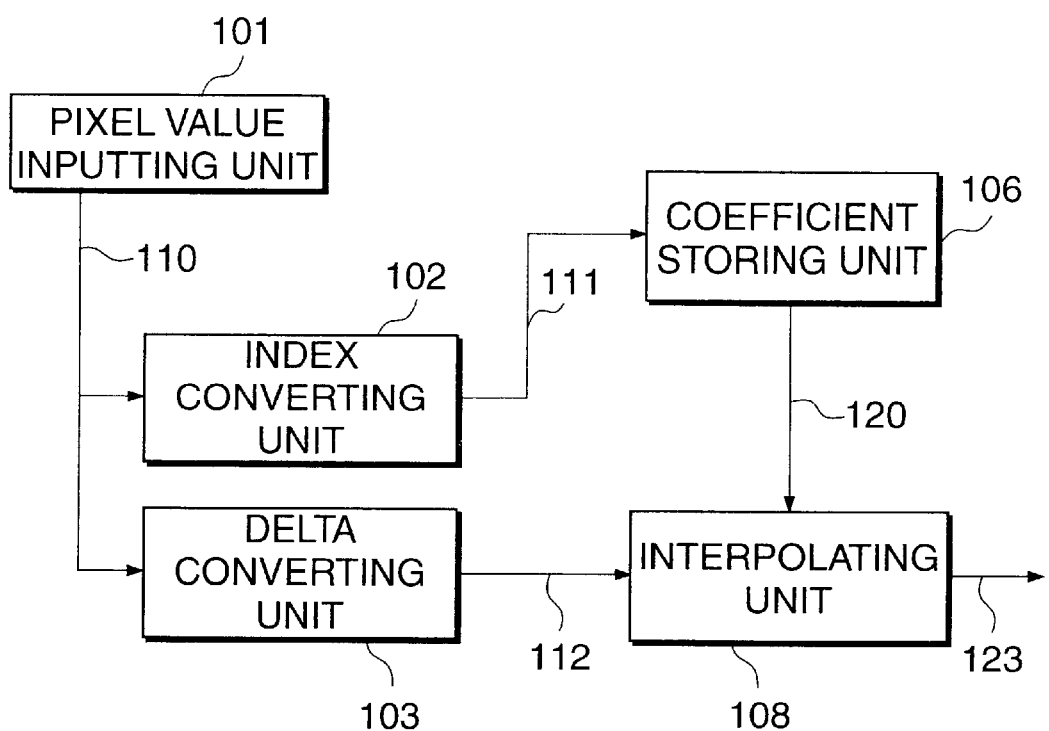
FIG. 13 is a view explaining a prior art.
Figure 14:
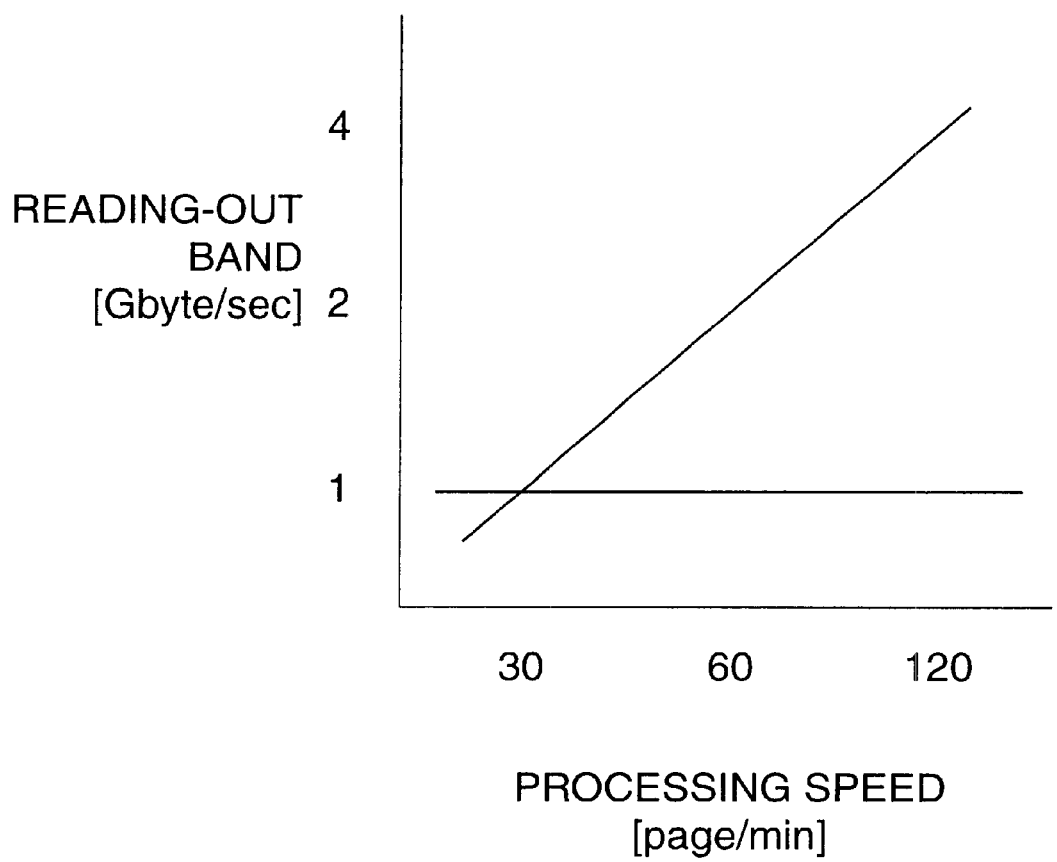
FIG. 14 is a view explaining a problem relating to a reading-out band of a coefficient in the prior art.

Subsequently, a specific construction of the fifth embodiment will be explained. FIG. 12 shows a constructional example of this embodiment. The portions in FIG. 12 corresponding to the portions in FIG. 11 are denoted by the corresponding numerals. In FIG. 12, the index signal and delta signal are supplied as 32 bit data all together. Specifically, there are 4 bit index and 4 bit delta signal with respect to each of YMCK, i.e., 32 (=4×4+4×4) bits. The coefficient storing memory 6 (converting table) 6 allots one bank to each of YMCK, receives the address of 4 bits in four times and outputs each coefficient of YMCK. The coefficient cache 7 may similarly have a bank construction, but in this example, it accesses an entry with an address of 16 (=4×4) bits of YMCK. The coefficient cache 7 comprises a tag unit and data unit. The tag unit stores the index (for the converting table) of 4 (YMCK)×4 bits. The data unit stores the coefficient data of 8bits×4 colors×16. The coefficient cache 7 further has a comparing device 7a and a controlling unit 7b. The index read from the tag unit is judged to be the same as the inputted index. If it is the same, it is inputted to the input buffer 5 of FIFO construction. If not the same, the controlling unit 7b makes the coefficient storing memory (converting table) in the enabling state to be accessed by the inputted index. As a result, the coefficient corresponding to the index is outputted from the coefficient storing memory 6, inputted to the input buffer 5 and written to the coefficient cache 7 with the corresponding index.

The delta signal (minor 4 bits×four colors) is supplied to the interpolating unit 8 via a buffer 3a. The pre-reading of the coefficient is performed by the delay of the buffer 3a, resulting in decreasing the latency as a whole.

As described above, a caching is adopted for reading out the coefficient in this invention, whereby a color conversion can be performed with high precision without enlarging the reading band of the coefficient storing memory (converting table).

Particularly, in the out-of-order method, the input pixel value that can be interpolated is firstly color-converted by using the coefficient already cached, to thereby be capable of enhance the hit ratio of the cache.

Further, in the bit mixing method, the interpolation coefficient of the close lattice point in the input color space is positioned in the close address in the memory address space upon constructing the converting table with the memory, whereby hit ratio of the cache can be enhanced from the general characteristics of the input image, i.e., that the similar pixel value is liable to continue.

Moreover, in the scan order changing method, the order of the converting processing of the input image pixel is changed into the order for increasing the correlation between the pixels, to thereby be capable of enhancing the hit ratio of the cache.

Additionally, the rereading method buffs the fluctuation in the reading-out speed of the interpolation coefficient in the case of reading out from the high-speed cache memory by hitting the cache and in the case of reading out from the slow main memory by miss-hit, to thereby be capable of improving the average reading-out speed.

Accordingly, a high-speed processing is possible in any method if the cache capacity is the same with one another. Alternately, the cache capacity can be reduced if the processing speed is the same with one another.

What is claimed is:

1. A color converting device comprising:
    a pixel value inputting part that inputs an input pixel value to a main body of the color converting device;
    an index converting part that outputs from the input pixel value an index signal showing a subspace to which the input pixel value belongs;
    a delta converting part that outputs from the input pixel value a delta signal showing a position of the input pixel value in the subspace;
    a coefficient storing part that outputs from the index signal an interpolation coefficient of a lattice point positioned at a top of the corresponding subspace;
    an interpolating part that obtains an output pixel value by an interpolating processing from the interpolation coefficient and the delta signal and outputs the output pixel value; and a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given.

2. A color converting device comprising:

a Pixel value inputting part that inputs an input pixel value to a main body of the color converting device;

an index converting part that outputs from the input pixel value an index signal showing a subspace to which the input pixel value belongs;

a delta converting part that outputs from the input pixel value a delta signal showing a position of the input pixel value in the subspace;

a coefficient storing part that outputs from the index signal an interpolation coefficient of a lattice point positioned at a top of the corresponding subspace;

an interpolating part that obtains an output pixel value by an interpolating processing from the interpolation coefficient and the delta signal and outputs the output pixel value;

a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given;

an input buffer that temporarily stores in pairs the index signal and the delta signal that are outputted respectively from the index converting part and the delta converting part, and then, outputs the pair;

an out-of-order controlling part that gives an instruction to the input buffer to read out the index signal temporarily stored therein and an instruction to the coefficient cache to read out the index signal temporarily stored therein, and then, compares the index signals with each other that are read out respectively from the input buffer and the coefficient cache, judges that the interpolation processing can be performed by using the cached interpolation coefficient when the index signals coincide with each other, gives an instruction to read out the pair of index signal and the delta signal from the input with a priority given to the signal that can be interpolated, and outputs the signal to the interpolating part; and an output buffer that temporarily stores the interpolated output pixel value at a position corresponding to the position designated in the instruction by the out-of-order controlling part to the input buffer to read out and output the output pixel value in the same order as that inputted by the pixel inputting part.

3. A color converting device comprising:

a pixel value inputting part that inputs an input pixel value to a main body of the color converting device;

an index converting part that outputs from the input pixel value an index signal showing a subspace to which the input pixel value belongs;

a delta converting part that outputs from the input pixel value a delta signal showing a position of the input pixel value in the subspace;

a coefficient storing part that outputs from the index signal an interpolation coefficient of a lattice point positioned at a top of the corresponding subspace, wherein the interpolation coefficient for the close lattice point in an input color space is stored in a close address in a memory-address space;

an interpolating part that obtains an output pixel value by an interpolating processing from the interpolation coefficient and the delta signal and outputs the output pixel value; and a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given.

4. A color converting device comprising:

a pixel value inputting part that inputs an input pixel value to a main body of the color converting device;

a scan order converting part that changes the order of the input pixel value to increase a correlation between pixels, and outputs the pixel value;

an index converting part that outputs from the input pixel value an index signal showing a subspace to which the input pixel value belongs;

a delta converting part that outputs from the input pixel value a delta signal showing a position of the input pixel value in the subspace;

a coefficient storing part that outputs from the index signal an interpolation coefficient of a lattice point positioned at a top of the corresponding subspace;

an interpolating part that obtains an output pixel value by an interpolating processing from the interpolation coefficient and delta signal and outputs the output pixel value;

a scan order reverse converting part that reversely converts an order of the output pixel value and outputs the output pixel value in the order same as the input pixel value outputted by the pixel inputting part; and a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given.

5. A color converting device comprising:

a pixel value inputting part that inputs an input pixel value to a main body of the color converting device;

an index converting part that outputs from the input pixel value an index signal showing a subspace to which the input pixel value belongs;

a delta converting part that outputs from the input pixel value a delta signal showing a position of the input pixel value in the subspace;

a coefficient storing part that outputs from the index signal an interpolation coefficient of a lattice point positioned at a top of the corresponding subspace;

an interpolating part that obtains an output pixel value by an interpolating processing from the interpolation coefficient and delta signal and outputs the output pixel value;

a coefficient cache that temporarily stores the interpolation coefficient read from the coefficient storing part and the corresponding index signal, outputs the interpolation coefficient instead of the coefficient storing part when an instruction for reading out the interpolation coefficient temporarily stored is given, while outputs the index signal to the coefficient storing part and reads out the interpolation coefficient when an instruction for reading out the interpolation coefficient not temporarily stored is given; and an input buffer that temporarily stores in pairs the index signal and the delta signal, and outputs the index signal and the delta signal in a manner of first-in-first-out.

6. A color converting device comprising:

a pixel value inputting part that inputs an input pixel value to a main body of the color converting device;

an index converting part that outputs from the input pixel value an index signal showing a subspace to which the input pixel value belongs;

a delta converting part that outputs from the input pixel value a delta signal showing a position of the input pixel value in the subspace;

a coefficient storing part that outputs from the index signal an interpolation coefficient of a lattice point positioned at a top of the corresponding subspace;

an interpolating part that obtains an output pixel value by an interpolating processing from the interpolation coefficient and the delta signal and outputs the output pixel value;

a coefficient temporarily storing part that temporarily stores the interpolation coefficient read from the coefficient storing part and the corresponding index signal, outputs the interpolation coefficient instead of the coefficient storing part when an instruction for reading out the interpolation coefficient temporarily stored is given, while notifies the corresponding index signal to the controlling part when an instruction for reading out the interpolation coefficient not temporarily stored is given;

an input buffer that temporarily stores in pairs the index signal and the delta signal that are outputted respectively from the index converting part and the delta converting part, and outputs the pair;

a controlling part that gives an instruction to the input buffer to read out the index signal and the delta signal temporarily stored in a predetermined order, outputs the corresponding index signal to the coefficient storing part when an index signal not temporarily stored is notified from the coefficient temporarily storing part, and, upon receiving the corresponding interpolation coefficient from the coefficient storing part, causes the coefficient temporarily storing part to store the corresponding interpolation coefficient, and gives an instruction to the input buffer to output the corresponding index signal and the delta signal; and an output buffer that temporarily stores the interpolated output pixel value at a position corresponding to the position designated in the instruction by the out-of-order controlling part to the input buffer to read out, and outputs the output pixel value in the same order as that inputted by the Pixel inputting part.

\* \* \* \* \*